United States Patent
Ovelius

(10) Patent No.: US 8,839,634 B2
(45) Date of Patent: Sep. 23, 2014

(54) ARRANGEMENT ADAPTED FOR ENERGY TRANSFORMATION

(75) Inventor: Bengt Seved Ovelius, Hestra (SE)

(73) Assignee: Picoterm AB, Solna (SE)

( * ) Notice: Subject to any disclaimer, the term of this patent is extended or adjusted under 35 U.S.C. 154(b) by 903 days.

(21) Appl. No.: 12/678,341

(22) PCT Filed: Sep. 17, 2007

(86) PCT No.: PCT/SE2007/000812
§ 371 (c)(1),
(2), (4) Date: Jul. 9, 2010

(87) PCT Pub. No.: WO2009/038500
PCT Pub. Date: Mar. 26, 2009

(65) Prior Publication Data
US 2010/0281900 A1    Nov. 11, 2010

(51) Int. Cl.
*F25B 9/00*   (2006.01)
*F03G 7/04*   (2006.01)
*F03G 7/00*   (2006.01)
*F24F 5/00*   (2006.01)
*F25B 9/14*   (2006.01)

(52) U.S. Cl.
CPC *F03G 7/002* (2013.01); *F03G 7/04* (2013.01); *F24F 5/00* (2013.01); *F25B 9/14* (2013.01)
USPC ............................................. 62/6; 62/238.7

(58) Field of Classification Search
USPC ....................................... 62/6, 467
See application file for complete search history.

(56) References Cited

U.S. PATENT DOCUMENTS

| | | | |
|---|---|---|---|
| 2,549,464 | A | 4/1951 | Hartley |
| 3,339,635 | A | 9/1967 | Brandon |
| 4,114,480 | A | 9/1978 | Ceperley |
| 4,489,553 | A | 12/1984 | Wheatley et al. |
| 5,183,234 | A * | 2/1993 | Saito ............................ 248/430 |
| 5,263,341 | A | 11/1993 | Lucas |
| 5,357,757 | A | 10/1994 | Lucas |

(Continued)

FOREIGN PATENT DOCUMENTS

| | | |
|---|---|---|
| DE | 199 24 322 | 12/2000 |
| EP | 0 570 177 | 11/1993 |
| SE | 0600997 L | 12/2007 |
| WO | 00/34721 | 6/2000 |

OTHER PUBLICATIONS

Office Action issued May 14, 2014 is European Patent Application No. 07808822.6.

*Primary Examiner* — Cheryl J Tyler
*Assistant Examiner* — David Teitelbaum
(74) *Attorney, Agent, or Firm* — Drinker Biddle & Reath LLP

(57) ABSTRACT

An arrangement is disclosed for energy transformation under the utilization of an oscillating gas volume sustained by an energy supplying device. A gas compression creates an elevated temperature and a gas decompression creates a reduced temperature within the gas volume. One or more first valves are connected to the space, wherein the first valve is controllably actuatable to supply or extract thermal energy to or from the space during a compression stage. One or more second valve are further connected to the space, wherein the second valve is controllably actuatable to supply or extract thermal energy to or from the space during a decompression stage. A control unit is adapted to briefly permit actuation of the first valve and the second valve within mutually discrete time intervals.

13 Claims, 7 Drawing Sheets

(56) References Cited

U.S. PATENT DOCUMENTS

| | | |
|---|---|---|
| 5,901,556 A | 5/1999 | Hofler |
| 6,079,214 A * | 6/2000 | Bishop .............................. 62/6 |
| 6,526,099 B1 * | 2/2003 | Christopoulos et al. . 375/240.26 |
| 6,868,673 B2 * | 3/2005 | Weiland et al. ................. 60/698 |
| 2003/0188541 A1 | 10/2003 | Howard |

* cited by examiner

ARRANGEMENT ADAPTED FOR ENERGY TRANSFORMATION

CROSS REFERENCE TO RELATED APPLICATIONS

This application is the National Stage of International Application No. PCT/SE2007/000812, filed Sep. 17, 2007.

TECHNICAL FIELD

The present invention relates in general to an arrangement adapted for energy transformation, and more particularly to an arrangement which is intended to make use of a gas volume which is gathered within a limited space structured as an oscillation and reciprocally oscillating, the volume normally consisting of an air volume.

The present invention is based on the feature that the oscillation of the gas volume within said space will be able to maintained by a small energy supplying device, such as a loudspeaker, a piston unit or the like, where an energy supply requisite herefor may be extremely limited, but nevertheless be able to create the preconditions for offering a high pressure within a compression stage and a low pressure within a decompression stage.

More particularly, the present invention is based on the known principle that a gas compression caused by a generated oscillation creates an elevated temperature within the whole or parts of said gas volume while a gas decompression caused by a generated oscillation creates a reduced temperature within the whole or parts of said gas volume.

The fundamental structure of the present invention rests on the above disclosed technical preconditions which are more closely explained in conjunction with appended FIGS. 1a, 1b and 2, but are also apparent from the embodiment according to FIG. 3.

BACKGROUND ART

Methods, arrangements and constructions relating to the above disclosed technical field and the nature of the arrangements are previously known in the art in a plurality of different embodiments.

Thus, it is previously known in the art that a "standing wave" can with a slight supply of energy be generated in order to oscillate with two of the nodes of the standing wave related to each one of two fixed wall portions and a thus generated standing wave will generate a gas compressing maximum and a gas decompressing minimum within one or more in the area between the nodes and the wall portions.

It is also known in the art that such an oscillating standing wave will create different molecular movements of the molecules of the gas and in this regard it is known that a compression of the molecules gives an increasing temperature and an inner increasing speed, while a decompression of the molecules gives a falling temperature and an inner reducing speed.

It is thus previously known in the art that such a compression and such a decompression will take place within the framework of a single period of the oscillation.

Patent Publication EP-0 570 177 illustrates and describes an acoustic resonator which comprises a chamber (2) and which chamber (2) is to be filled with a fluid, a non-compressible fluid in the form of a liquid.

Further, the chamber (2) is to be given a geometry which is to require a self-destructive interference for at least one harmonic oscillation within the liquid volume in order to be able to avoid a shock-generating wave form, in finite acoustic pressure amplitudes.

The chamber may display wave damping terminations at both ends or a wave reflecting termination at its one end.

A drive mechanism makes for oscillation of the chamber to a frequency approximating to a selected resonance frequency or—node related to the chamber proper.

In such instance, it is disclosed that the drive mechanism may be given the configuration of a piston arrangement relating to an open portion for the chamber, an electromagnetic converter of an electromagnetic drive unit.

More specifically, there is here disclosed an application in a heat exchanging system, under the utilisation of a fluid and it is here known, for this application, to utilise valves (34a, 34b) for a pressure distribution and a partial vacuum distribution.

Patent Publication DE-19 924 322 A1 illustrates and describes an acoustic compressor and the contents in this Patent Publication are to be considered as the most relevant and closely related prior art technology, since it relates to a purely acoustic application.

The Patent Publication in question discloses the utilisation of a gas filled resonance tube (1), with a specific geometry, whose one end (A) displays a membrane (2) actuable by an oscillation circuit (3), such as a sound amplifier, in order to create a standing wave within the resonance tube (1).

There is at the other end (B) of the resonance tube a valve arrangement (10), with an inlet and outlet valve (11, 12) and these valves are controllable in order to be able to introduce an extract the gaseous medium (G) intended for the compression.

More specifically, the prior art technology discloses that the gaseous medium (G) is to consist of a coolant (R134a or $CO_2$) and that the length and oscillation frequency of the resonance tube (1) are to be adapted to the sonic speed of the coolant.

The inlet valve and the outlet valve are here intended to introduce or lead off the coolant.

It is also illustrated here how the standing wave of a wave form will offer a gas pressure ("P") and where this gas pressure may come to vary and oscillate, between a condensation pressure ($P_c$) and a vaporisation pressure ($P_e$).

Patent Publication U.S. Pat. No. 5,357,757 illustrates and describes a compressor, which also builds on the utilisation of a chamber (2) provided with an inlet port (4) and an outlet port (6).

A one-way valve (8) is adapted to be able conduct a medium (liquid or air) so as only to be able to leave the chamber (2).

A sound generator (10) consists of a metallic membrane (16) and a coil (22) about a magnet (18). The sound generator (10) is driven by an AC generator (16) via the conductors (14) and where this sound generator (10) need not necessarily display a wide frequency spectrum.

Patent Publication U.S. Pat. No. 4,114,380 is intended to illustrate a heat machine, where a migrating wave is to be created and where this machine could be used as a motor or as a heat pump.

U.S. Pat. No. 5,263,341 illustrates and describes a compressor operative with the aid of a standing wave in a compressor in a cooling system or a vaporiser.

International Patent Publication WO 0 034 721 A1 illustrates an arrangement intended for the automatic production of ice, where a container is to be cooled via thermo acoustics.

Considering now the present invention is the light of the prior art, it may be ascertained that it is known to create the preconditions in order, via a generated standing sonic wave within an air space with the aid of valves, to extract excess pressure and/or partial vacuum at given temperatures and thereby be able to drive machines, such as motors or as heat pumps.

Against this background, the present invention now builds on an arrangement adapted for energy transformation while utilising an oscillating gas volume gathered within a space, where the movement of the gas volume within said space is sustained by an activated energy supplying device and where a gas compression caused by the oscillation makes for the creation of an elevated temperature within the whole or parts of said gas volume and where a gas decompression caused by the oscillation makes for the creation of a reduced temperature within the whole or parts of said gas volume.

The following expressions have been selected to be employed in the following description:

a. "Standing wave" is a wave phenomenon which is formed by two or more wave movements or undulations which move in opposing directions of movement and which are superposed with one another and thereby occur bites or bulges and nodes along the waves which appear to stand still and swing or oscillate reciprocally, where the wave has its largest amplitude in the bulges and its least amplitude in the nodes and where the distance between the nodes is half of a wave length $L=\lambda/2$.

b. "First valve related means" consists of a valve device for permitting the supply to or removal from a gas volume within a space of thermal energy during a compression stage.

c. "Second valve related means" consists of a valve device for permitting the supply to or removal from a gas volume within a space of thermal energy during a decompression stage.

d. "ARR unit" consisting of an arrangement which satisfies the requirement for an "Acoustic Reversible Resonator".

BRIEF SUMMARY OF THE PRESENT INVENTION

Technical Problem

Taking into account the circumstance that the technical considerations which a person skilled in the relevant technical field must do in order to be able to offer a solution to one or more set technical problems is initially a necessary insight into the measures and/or the sequence of measures to be implemented and on the hand a necessary selection of the means required, in view hereof the following technical problems are likely to be relevant in the evolution of the subject matter of the present invention.

Taking into account the state of the art as described above, it is probably likely therefore to be seen as a technical problem to be able to realise the importance of, the advantages associated with and/or the technical measures and considerations which will be required in order, with simple means, to make for the creation of a heat engine with a high level of efficiency and which, in many applications, could advantageously supersede petrol driven and/or diesel driven engines.

Taking into account the state of the art as described above, it is probably therefore likely to be seen as a technical problem to be able to realise the importance of, the advantages associated with and/or the technical measures and considerations which will be required in order, with simple means, to make for the creation of a heat engine which can operate with slight, or even extremely slight, temperature differences, such as for example 10° C., at the cost of a low level of Carnot efficiency (roughly approx. 4%) and thereby make for the generous and free utilisation of available energy flows in the countryside for producing electric energy.

Taking into account the state of the art as described above, it is probably likely therefore to be seen as a technical problem to be able to realise the importance of the advantages associated with and/or the technical measures and considerations which will be required in order, with simple means to create a simple and practically maintenance free heat pump arrangement.

Taking into account the state of the art as described above, it is probably likely therefore to be seen as a technical problem to be able to realise the importance of, the advantages associated with and/or the technical measures and considerations which will be required in order, with simple means to create a simple air conditioning plant.

Taking into account the state of the art as described above, it is probably therefore likely to be seen as a technical problem to be able to realise the importance of, the advantages associated with and/or the technical measures and considerations which will be required in order, in an arrangement adapted for energy transformation, and utilising an oscillating gas volume gathered within a space, where the reciprocally oscillating movement of the gas volume within said space is sustained by an energy supplying device and where a gas or air compression caused by the oscillation makes for the creation of elevated temperature within the whole or parts of said gas volume and where a gas of air decompression caused by the oscillation creates a reduced temperature within the whole or parts of said gas volume, to make for an energy transformation associated with a high level of efficiency and with the aid of and under the utilisation of simple construction measures in order to create such an energy transformation arrangement as, with simple energy supply and simple construction, is capable of creating an engine arrangement, a heat pump arrangement or the like.

There resides a technical problem in being able to realise the importance of, the advantages associated with and/or the technical measures and considerations which will be required in order, to said space, to connect one or more valve-related means, that said first valve-related means be actuable such that there will be able, to or from said gas volume and space, to supply or extract thermal energy during a compression stage for said gas volume, that there is in addition connected to said space one or more second valve-related means, where said second valve-related means are to be actuable so that they, to or from said gas volume and space, will be able to supply or extract thermal energy under a decompression stage for said gas volume.

There resides a technical problem in being able to realise the importance of, the advantages associated with and/or the technical measures and considerations which will be required in order to cause one and the same space to be adapted so as to be able to fulfil the function of a heat pump or of an engine unit, by supplying energy in a heat pump application and by extracting energy in an engine application, by utilising the oscillating movement of a membrane or a device serving as a membrane within the space.

There resides a technical problem in being able to realise the importance of, the advantages associated with and/or the technical measures and considerations which will be required in order to cause said space to be defined so as to form nodes related to a standing wave and/or that the defining wall portions of the space are to form two nodes for a standing wave.

There resides a technical problem in being able to realise the importance of, the advantages associated with and/or the technical measures and considerations which will be required in order to cause said second valve-related means, for the supply of energy, to be adapted to supply, at a lowest pressure, a quantity of energy from a heat source at a given low temperature during a decompression stage, and at a compression stage, via first valve-related means to supply energy to a heat consumer.

There resides a technical problem in being able to realise the importance of, the advantages associated with and/or the technical measures and considerations which will be required in order to cause said first valve-related means, in a compression stage, to be adapted to supply energy from a heat source at a higher temperature level and, via second valve-related means and given decompression stage, to emit energy at a low temperature level.

There resides a technical problem in being able to realise the importance of, the advantages associated with and/or the technical measures and considerations which will be required in order to cause first valve-related means and second valve-related means to be adapted so as simultaneously to make for the supply or extraction of energy by a simultaneous actuation or alternatively that a control unit, with a given control method, is adapted to actuate said first valve-related means and/or said second valve-related means within the same of mutually discrete time intervals.

There resides a technical problem in being able to realise the importance of, the advantages associated with and/or the technical measures and considerations which will be required in order to cause said space to be given the form of a tube section corresponding to a resonance frequency, with sealed end portions as reflecting and node-allocated wall portions, a configuration corresponding to a torus and/or a configuration corresponding to a sphere, however taking into consideration requisite resonance effect and/or reflection effect.

There resides a technical problem in being able to realise the importance of, the advantages associated with and/or the technical measures and considerations which will be required in order to cause a first valve mechanism serving as first valve-related means to be disposed or oriented within an area where a pressure maximum is to be expected or alternatively that a second valve mechanism, serving as second valve-related means, is to be oriented within an area where a pressure minimum is to be expected so that a cold air current can be fed or led through the space at and temporarily proximal to a pressure minimum during a decompression stage.

There resides a technical problem in being able to realise the importance of, the advantages associated with and/or the technical measures and considerations which will be required in order to cause said control unit, with its allocated control method, to be adapted to actuate one or more valve-related means.

There resides a technical problem in being able to realise the importance of, the advantages associated with and/or the technical measures and considerations which will be required in order to cause a second valve mechanism, serving as second valve-related means, to be disposed or oriented within an area where a pressure minimum is to be expected, or alternatively that a first valve mechanism, serving as a first valve-related means is to be oriented within an area where a pressure maximum is to be expected, so that a hot air current can be fed or led through the space at and temporarily proximal a pressure maximum during a compression stage.

There resides a technical problem in being able to realise the importance of, the advantages associated with and/or the technical measures and considerations which will be required in order to cause said valve mechanisms to be related at right angles in relation to one another and moreover dimensioned for rapid and large gas flows.

There resides a technical problem in being able to realise the importance of, the advantages associated with and/or the technical measures and considerations which will be required in order, via circuits within the control unit, to be able to offer a phase difference between the opening times for utilised valve mechanisms which is adapted so that the coordination, such as via control methods allocated to the control unit, can create the preconditions to make for the utilisation of a powerful gas flow.

There resides a technical problem in being able to realise the importance of, the advantages associated with and/or the technical measures and considerations which will be required to cause the compression stage and the decompression stage to be adapted to be able to displace a membrane, whose reciprocally directed displacement movements are adapted to be able to initiate and offer said energy transformation.

There resides a technical problem in being able to realise the importance of, the advantages associated with and/or the technical measures and considerations which will be required to cause a gas volume within the space to be given an oscillating resonance frequency with the aid of simple and energy economical means.

There resides a technical problem in being able to realise the importance of, the advantages associated with and/or the technical measures and considerations which will be required to permit an acoustic reversible resonator, an ARR unit, to be structured as a block, with opposing valve mechanisms connected to a hot loop, carrying gas or air at high pressure and high temperature.

There resides a technical problem in being able to realise the importance of, the advantages associated with and/or the technical measures and considerations which will be required for permitting connection to the block of further opposing valve arrangements, connected to a cold loop, carrying gas or air at low pressure, such as atmospheric pressure and at low temperature.

Solution

In such instance, the present invention takes as its point of departure the prior art as disclosed by way of introduction, where an arrangement adapted for energy transformation, utilising an oscillating gas volume gathered within a space, where the reciprocally oscillating movements of the gas molecules under resonance preconditions within said space is sustained by an energy supplying device, which builds on the known principle that a gas compression caused by the resonance oscillation makes for the creation of an elevated temperature within the whole or parts of said air volume and a gas decompression caused by the resonance oscillation makes for the creation of a reduced temperature within the whole or parts of said gas volume.

In order to be able to resolve one or more of the above disclosed technical problems, the present invention particularly discloses that the prior art be supplemented by the feature that there shall be connected, to said space, one or more first valve-related means, that said first valve-related means is to be actuated in order to permit the supply or removal, to or from said gas volume within said space, of thermal energy during a compression stage for said gas volume, that there is to be connected to said space one or more second valve-related means, that said second valve-related means are actuated in order to make for the supply or removal, to or from said gas volume within said space, of thermal energy during a decompression stage of said gas volume.

As proposed embodiments, falling within the scope of the basic concept of the present invention, it is moreover disclosed that one and the same space is adapted to be able to fulfil the function of a heat pump or of an engine unit, in that, in a heat pump application, energy is supplied and, in an engine application, energy is removed, through the movement of a membrane, or a device serving as a membrane, within the space.

It is further disclosed that said space is to be defined by means of nodes related to a standing wave or alternatively that the defining wall portions of the space form two nodes for a standing wave.

Further, the present invention discloses that said second valve-related means, for supply of energy, is adapted, at a lowest pressure, to make for the supply of a quantity of energy from a heat source at a given low temperature during a decompression stage and, in a compression stage, via said first valve-related means, to make for the supply of energy to a heat consumer.

It is further proposed that said first valve-related means, in a compression stage, be adapted to supply energy from a heat source at a higher temperature level in order, via second valve-related means and associated decompression stage, to make for the emission of energy at a low temperature level.

A first valve-related means and a second valve-related means are adapted simultaneously to make for the supply or removal of energy through one simultaneous actuation.

It is further disclosed that a control unit, with an allocated control method, is adapted to make for the actuation of said first valve-related means and/or said second valve-related means within the same or mutually discrete time intervals.

Said space is advantageously to be given the configuration of an elongate tube section with sealed end portions as wave reflecting wall portions, but the space may also be structured as a torus or the like, where preconditions have been created to permit accumulation of acoustic energy be the supply of minor amounts of energy at each individual period.

It is further disclosed that a first valve mechanism, serving as first valve-related means, be oriented within an area where a pressure maximum is to be expected, or alternatively that a second valve mechanism, serving as second valve-related means, is oriented within an area where a pressure minimum is to be expected, so that a cold air current can be fed or led through the space at and temporarily proximal a pressure minimum during a decompression stage.

A second valve mechanism, serving as second valve-related means, is oriented within an area where a pressure minimum is to be expected, or alternatively that a first valve mechanism, serving as a first valve-related means is oriented within an area where a pressure maximum is to be expected, so that a hot air current can be fed or led through the space at and temporarily proximal a pressure maximum during a compression stage.

It is further proposed that said valve mechanisms may then advantageously be related at right angles to one another.

An adapted and well defined selected phase difference between the opening times for the two valve mechanisms is, for example such as by the control unit, adapted in order thereby to be able to create a powerful air current.

More specifically, the present invention discloses a construction of an acoustic reversible resonator, formed as a block, where opposing valve mechanisms may be connected to a hot loop carrying gas or air at high pressure and at high temperature.

There may be connected, to the block, further opposing valve arrangements, connected to a cold loop, carrying gas or air at low pressure, such as atmospheric pressure, and at low temperature.

Advantages

Those advantages which may principally be deemed to be characteristic of the present invention and the specific significative characterising features disclosed thereby are that there have hereby been created the preconditions in order, in an arrangement adapted for energy transformation during the utilisation of an oscillating gas volume gathered within a space, where the reciprocally directed resonance adapted oscillation movement of the gas volume within said space is sustained by an energy supplying device and where a gas compression caused by the oscillation makes for the creation of an elevated temperature within whole or parts of said gas volume and where a gas decompression caused by the oscillation makes for the creation of a reduced temperature within the whole or parts of said gas volume, to create such preconditions that there are connected, to said space, first valve-related means, where said first valve-related means are controllably actuable by circuits within a control unit in order to supply or remove, to or from said space, thermal energy during a compression stage for said gas volume, and moreover there are to be also connected to said space second valve-related means, said second valve-related means being controllably actuable by the control unit in order to supply or remove to or from said space thermal energy during a decompression stage for said gas volume.

That which may principally be deemed to be characteristic of the present invention is disclosed in the characterising clause of appended claim 1.

BRIEF DESCRIPTION OF THE ACCOMPANYING DRAWINGS

The basic preconditions for the present invention and one currently proposed embodiment, displaying the significative characterising features associated with the present invention, will now be described in greater detail hereinbelow for purposes of exemplification and with reference to the accompanying Drawings, where:

DESCRIPTION OF CURRENTLY PROPOSED EMBODIMENT

By way of introduction, it should be emphasised that in the following description of one currently proposed embodiment which displays the significative characterising features associated with the present invention and which has been clarified as a result of the figures illustrated in the accompanying Drawings, we have selected terms and a specific terminology with the intention in such instance principally of clarifying the inventive concept.

However, in this context it should be observed that expressions selected here should not be seen as restrictive exclusively to the terms utilised and selected here but it should be understood that every such selected term is to be interpreted so that in addition it encompasses all technical equivalents which function in the same or substantially the same manner in order in such instance to be able to attain the same or substantially the same intention and/or technical effect.

With reference to appended FIGS. 1a, 1b and to FIG. 2 with its three illustrations, as well as also to FIG. 3 there are thus shown schematically and in detail the basic preconditions for the present invention and where the significative properties associated with the present invention have been given concrete form as a result of the embodiments now proposed and more closely described in the following description with reference to FIGS. 3 to 9.

The basic preconditions for the present invention reside in that illustrated and described with reference to FIGS. 1a, 1b, FIG. 2 as well as to FIG. 3.

Figure 1A:
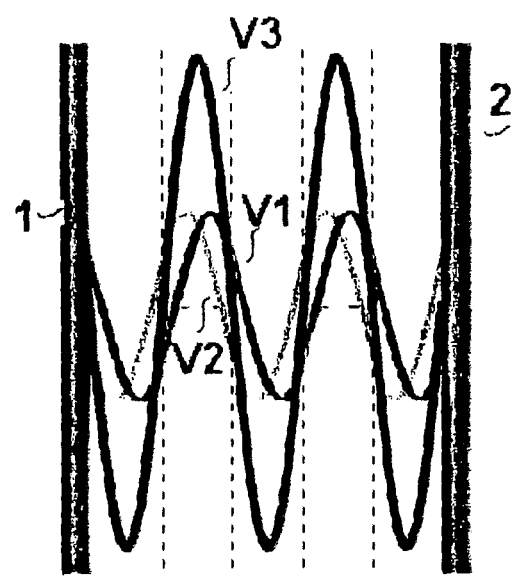
FIG. 1a shows how a generated oscillation movement by reflection can form a reflected wave and moreover a composite wave structure, where a thus composite wave structure will be resonance related and form a standing wave structure, intended to come into use within the present invention.

Thus, FIG. 1a illustrates how a composite wave structure "V3" may be formed from a generated wave "V1", which is reflected between two opposing wall portions 1, 2 and a reflected wave "V2". The curves also symbolise "gas displacement", by which is taken to signify the displacement of the gas molecules from their state of equilibrium in accordance with classical acoustics.

Figure 1B:
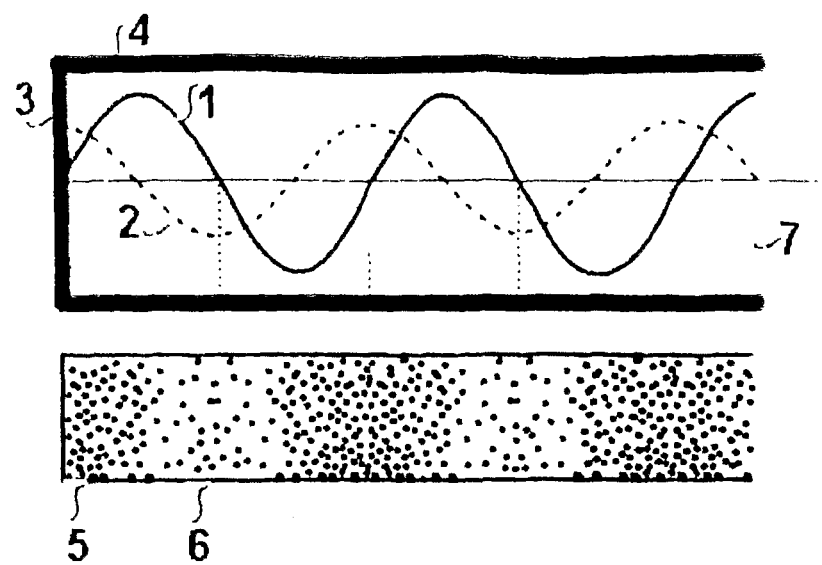
FIG. 1b is intended to illustrate how a wave (2) will create pressure increases (5) and pressure reductions (6) within different sections of a space (7) within a closed cavity (4, 7) with a wall portion (3)

FIG. 1b shows how a composite wave structure 1, which describes "air displacement" related to the pressure in the gas, is symbolised by a ghosted line 2.

An area 5, which is at high pressure and thereby a short distance between the molecules, displays an elevated temperature and an area 6, which is at low pressure and thereby a large distance between the gas molecules, displays a low temperature.

A node for "air displacement" constitutes an antinode for the pressure and vice versa in accordance with classical acoustics.

The above considered compression effect and decompression effect here apply for each period.

FIG. 1b also shows by way of example that the one end of the tube may be closed (3) and the other end of the tube may be open. At the open end, a ghosted pressure curve (2) constitutes a node and at the closed end the pressure curve constitutes an antinode.

It will be obvious to the skilled reader that a loudspeaker of a piston may be placed at many different positions, either inside the tube or in the open end of the tube.

The best effect can be expected when the "air displacement" is at its greatest, i.e. in the bulges of the solid line graph 1.

FIG. 2 illustrates in FIGS. "2a", "2b" and "2c", a primary standing wave 1 with molecular movements 5 related thereto applicable to a pressure elevation and a heat elevation or alternatively 6 applicable to a pressure reduction and a heat reduction.

FIG. 2 also illustrates the graph 2 for the pressure within the standing wave.

Figures 2A, 2B, 2C:
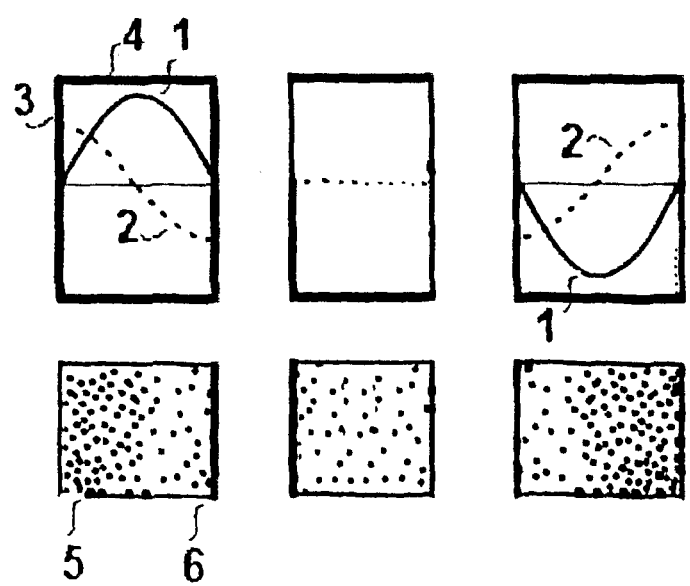
FIG. 2 shows in three different sequences a thus standing wave (2) with molecular movements related thereto, in order to illustrate a temperature increase within a bulge corresponding to a pressure increase (5), and a corresponding pressure reduction (6) adjacent a node with corresponding temperature reduction.

FIG. 2b also illustrates an intermediate position between 2a and 2c, where the pressure is uniform and the molecules more uniformly distributed.

FIG. 2c is intended to illustrate how the elevated pressure is displaced from the one wall portion to the other and then back again during a single period.

Figure 3:
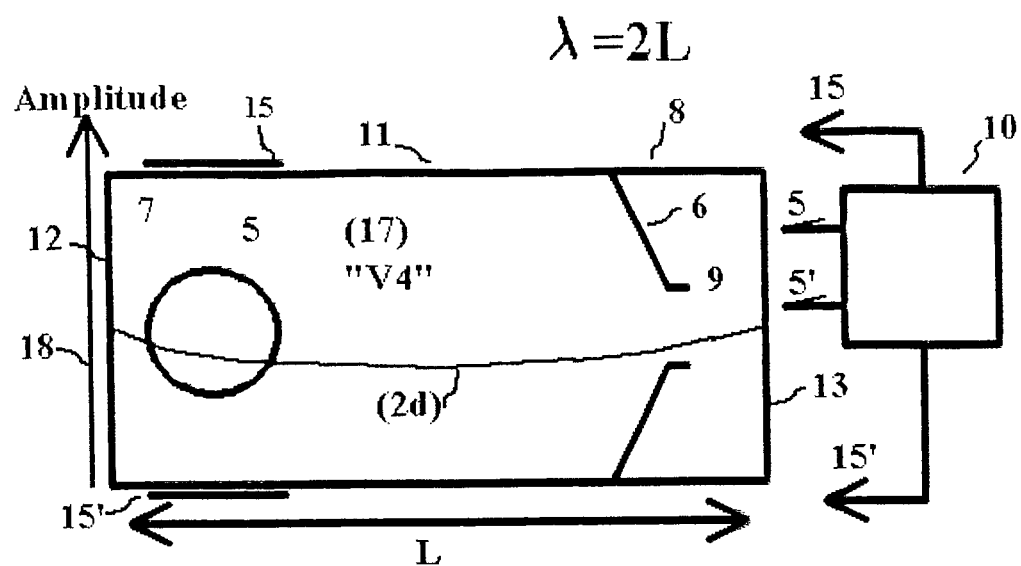
FIG. 3 shows a standing wave within a space (7) with schematically illustrated valves and a membrane, operating in accordance with the principles of the present invention.

FIG. 3 illustrates a schematic application of the present invention with a primary standing wave "V4".

The arrangement 8 according to the present invention displays valve-related means 5 and a reciprocally movable membrane 6 illustrated as a loudspeaker, in order to make for the creation of a standing wave with resonance frequency within the defined space 7.

Thus, FIG. 3 illustrates an arrangement 8 adapted for energy transformation under the utilisation of a gas volume (17) oscillating within a space 7 adapted to a selected resonance frequency, where the reciprocal oscillating movement of the gas volume within said space 7 is sustained by an energy supplying device 9, in the form of a loudspeaker unit 9, and where a gas compression caused by the oscillation makes for the creation of an elevated temperature within all or parts of said gas volume (17) and where a gas decompression caused by the oscillation makes for the creation of a reduced temperature within all or parts of said gas volume (17).

There are connected to said space 7 one or more first valve-related means 5, where said first valve-related means 5 is, by a control unit 10, controllably actuated in order to supply or extract, to or from said space 7, gas borne thermal energy during a compression stage 5 for said gas volume (17).

Further, there is connected to said space 7 one or more second valve-related means 15, where said second valve-related means 15 are controllably actuated via the control unit 10 in order to supply or withdraw to or from said space 7 gas borne thermal energy under a decompression stage 6 for said gas volume (17).

Said control unit 10 is, with allocated one or more control methods, adapted via internal circuitry to actuate said first valve-related means 5 and said second valve-related means 15 within very short and mutually discrete time intervals. Different repetition frequencies are possible; one proposed repetition frequency is 50 Hz.

Said space 7 may, as the embodiment in FIG. 3 shows, be given the form of an elongate hollow cylinder-shaped tube section 11 with sealed end portions 12, 13, where the configuration and dimensions of the tube section, together with utilised end portions, is to be adapted to a resonance frequency, for example of 50 Hz, but may naturally as an alternative display a configuration of a torus or corresponding a figuration, but with requisite apertures for requisite valve-related means 5, 15.

More specifically it is disclosed, for the illustrated embodiment, that a first valve mechanism, serving as first means 5, is to be oriented to an end region of said elongate tube section 11 and is actuated by the control unit 10 such that a hot air current may be supplied to the space 7 at and temporarily proximal a pressure maximum during the compression stage.

A second valve mechanism, serving as a second-related means 15, is to be oriented to the same end region of said tube section 11 and is actuated by the control unit 10 so that a cold air current may be supplied to the space at and temporarily proximal a pressure minimum during the decompression stage.

Said valve mechanisms 5, 15 are in this application advantageously to be related at right angles to one another and diametrically oriented 5, 5'; 15, 15'.

A phase difference between the opening times for the valve mechanisms 5 and 15, respectively, is adapted, for example by the circuit arrangement within the control unit 10, in order to be able to create a powerful air current.

Selected air currents, such as at a low temperature operation (for example below 10° C.), can be adapted to the order of magnitude of 1 to 5 m³/sec.

The valve-related means 5, 15 are configured and adapted with a large open surface, such as for example ⅕ m² at a speed of the air current of 4 to 8 m/sec.

The compression stage and the decompression stage are adapted so as to displace an elastic membrane 6 or a conventional piston with crank gear, whose displacement movements are adapted for said energy transformation.

More specifically, it is disclosed that energy is supplied to the space 7 and the movement of the membrane 6 so that during the compression stage a temperature of several hundred degrees Celsius occurs.

Energy may also be led off from the space 7 and the movement of the membrane 6 so that, during the decompression stage, a minus temperature related to degrees Celsius occurs.

Said control unit 10 may be adapted to actuate a piston movement (not shown) reciprocally directed in the tube section 11, or the like, with the piston movement adapted to the resonance frequency.

The air mass (17) is within the space 7 and thereby given an "oscillating" resonance frequency.

An above described unit or arrangement 8 could be entitled an acoustic reversible resonator, entitled "ARR unit" and is structured as a block 18, with opposing second valve mechanisms 15, 15' connected to a cold loop, carrying gas or air of low pressure and at low temperature.

There are connected to the block 18 additional opposing first valve mechanisms 5, 5' connected to a hot loop, carrying gas or air at high pressure, such as above atmospheric pressure, and at high temperature.

Figure 4:
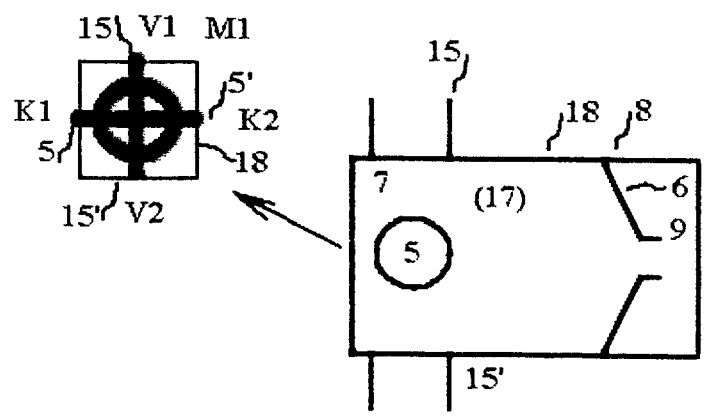
FIG. 4 illustrates a sketch presentation of a construction block for an acoustic reversible resonator, designated "ARR unit", as well as a fundamental embodiment of such a resonator.
Figure 5:
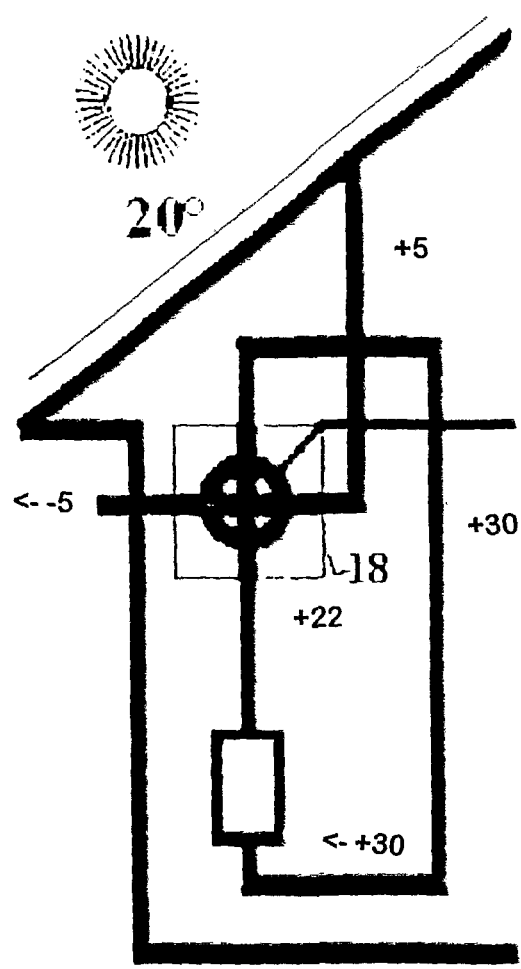
FIG. 5 shows one proposed embodiment, where an "ARR unit" according to FIG. 4 is utilised to constitute a heat pump plant.

The practical application of the present invention will now be described in greater detail hereinbelow, where: FIG. 4 is a sketch presentation of a construction block for an acoustic reversible resonator, designated "ARR unit" 18, FIG. 5 illustrates a first proposed embodiment where an "ARR unit" 18 is utilised to constitute a heat pump plant.

Figure 6:
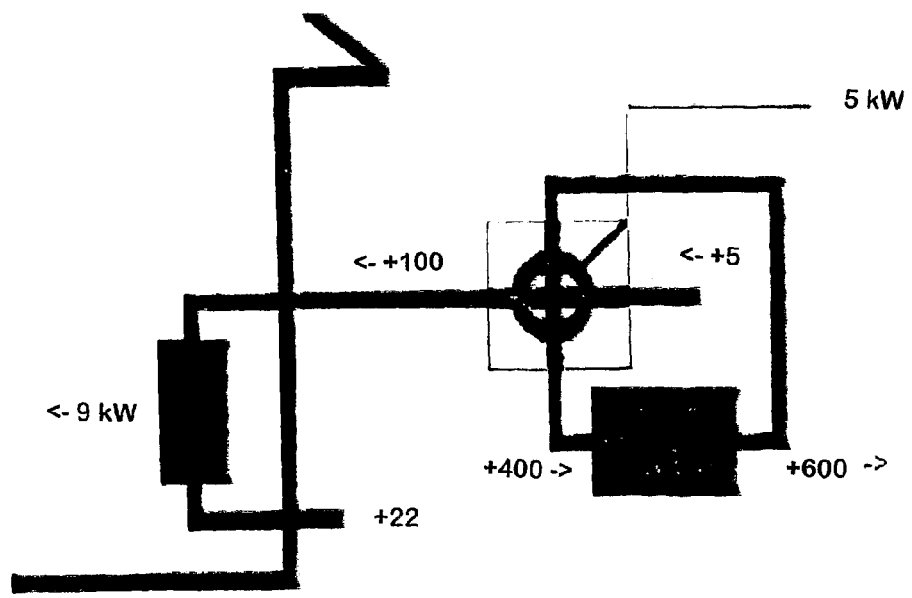
FIG. 6 illustrates an engine arrangement, adapted for a high temperature application.
Figure 7:
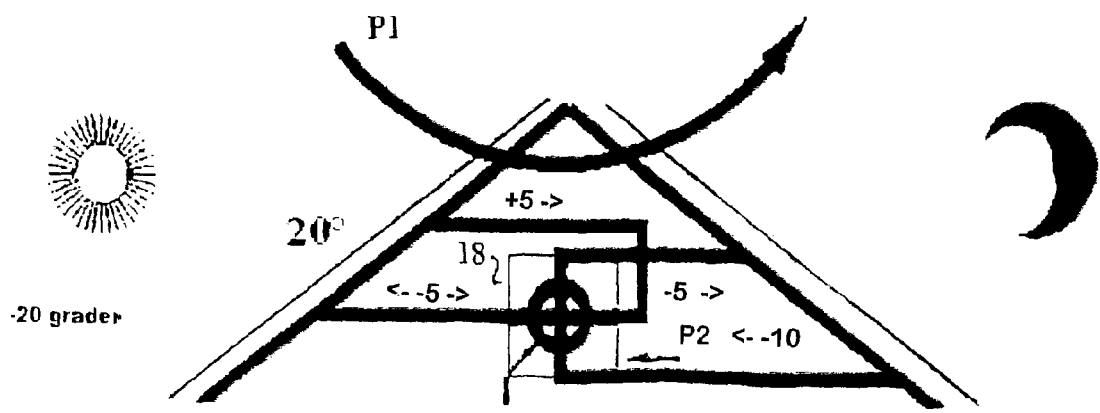
FIG. 7 illustrates an engine arrangement, adapted for a low temperature application.
Figure 8:
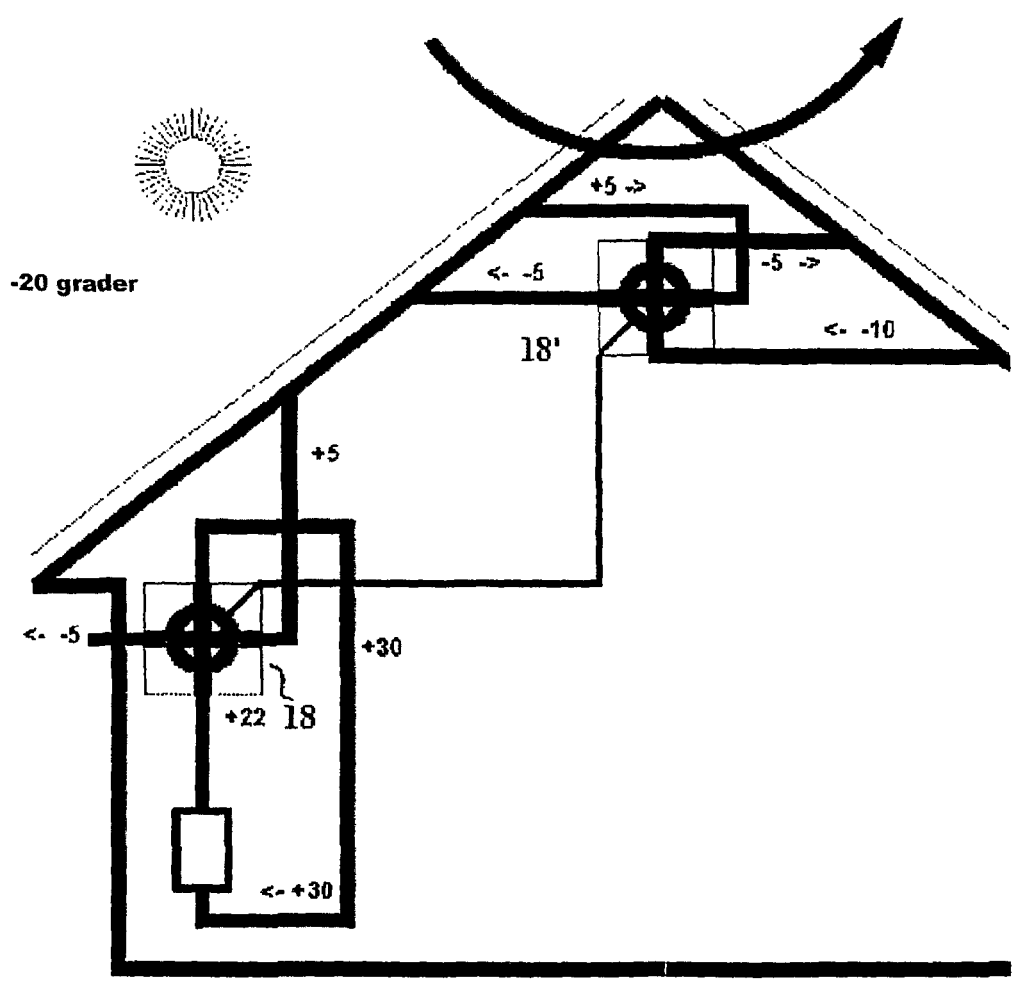
FIG. 8 illustrates an engine arrangement and a heat pump equipment or a heat pump plant in a proposed combination.

FIG. 6 illustrates an engine arrangement, adapted for a high temperature application, FIG. 7 illustrates an engine arrangement adapted for a low temperature application and FIG. 8 illustrates an engine arrangement and a heat pump unit in one proposed combination.

A second valve mechanism 15, 15', on the tube 11 in FIG. 3 and actuated by the control unit 10 ensures that the cold flow is opened at pressure minimum and the first valve mechanism 5, 5' placed at right angles also on the tube 11 and actuated by the control unit 10 ensures that the hot current is opened at pressure maximum.

No fans are necessary here, merely that a slight phase difference occurs at the moment of opening in order to create the preconditions which will cause a powerful air flow.

Simulations carried out indicate that the air flows must be extremely large at a low temperature operation, for example of the order of magnitude of cubic meters/second. Therefore, the valve mechanisms 5, 5'; 15, 15' must also display a very large opening and closable surface area (typically of the order of ⅕ square meter at a flow rate of 5 m/s). At high temperature operation, considerably smaller opening surfaces come into question.

FIG. 5 illustrates an assumed condition where winter temperatures are presupposed of −20° C. in the air and the other disclosed temperature relationships in FIG. 5 can nevertheless occur.

In weak winter sun and the utilisation of an energy roof the outdoor temperature reaches all the way in beneath the energy roof+5°. This air is pumped down to the "ARR unit" 18, where it is cooled and released.

In the warm circuit, the "ARR unit" 18, delivers air of a temperature of +30° C., which is here conducted to heat the building.

When the building is heated, this air falls to 22° C. and is recycled to the warm circuit of the "ARR unit 18, where electric power is once again supplied.

In that the energy roof preheats the air and in that the "ARR unit" 18 operates almost free of friction, the objective is that a thermal factor should lie above the value of 10 during a greater part of a 24 hour cycle.

FIG. 6 illustrates an "ARR unit" which works as a high temperature engine.

The warm circuit can utilise any fuel whatever. The thermal energy can wholly be produced inside the warm circuit, but may, as in a Stirling engine, also be produced outside (heat exchange). Here a high temperature and an extremely high excess pressure (of the order of 10-20 atmospheres) prevail.

The advantage in producing thermal energy under excess pressure is that it is successfully possible to combust even wet sawdust etc.

A slow air flow during the process in order to produce thermal energy is required for complete combustion. Supplied air with its oxygen content will have a high partial pressure, which also contributes to the desired complete combustion.

If diesel oil is utilised as fuel, soot particles are avoided, since combustion takes place at high temperature, high pressure and over a long period of time.

Extremely lean mixing ratios are to be preferred here (extreme air surplus).

This together with a high compression factor opens avenues for an extremely high level of efficiency in this context (for example up to 40%) regardless of the type of fuel employed.

If an engine unit is employed as a boiler in a building, a building may be heated with the exhaust gases.

A considerable electric power can also be generated (for example 5 kW) which may then be employed in the household or sold to the electricity distribution network.

For every sawmill, farm etc., considerable quantities of electric energy can be generated from ecological waste products. The ash can be recycled to the fields.

FIG. 7 illustrates an application where the "ARR unit" 18 works as a low temperature engine. The embodiment is based on the feature that, during almost every annual season, it is possible to utilise temperature differences of 10° C. or more. In this embodiment, it is assumed that there exists a temperature difference which can be utilised between roof to sun and roof to shadow. Instead, use can be made of a well, outdoor air, lake etc. as temperature source.

The arrow "P1" represents an energy flow from heat to cold.

An "ARR unit" 18 can convert a max. of approx. 4% of this energy to electric power in accordance with Carnot's known efficiency formula (T2-T1)/T2.

This is, granted, a low level of efficiency compared with that which can be obtained from solar cells (15%) but on the other hand a roof is larger in surface area and the flow is taken care of at no cost.

An "ARR unit" 18 according to the principles of the present invention also functions during winter nights and so on, while solar cells in practice need summer sunlight.

A small electric power level can be generated in this way (for example 500 W).

If this is combined with a heat pump, which has an extremely high thermal factor, 500 W can supply heat to one dwelling.

At a thermal factor selected at 10, the emitted power of the heat pump in this application will be 5 kW.

FIG. 8 illustrates a combination of an engine unit and a heat pump.

An "ARR unit" 18 here generates electric power from a suitably selected temperature difference.

Another "ARR unit" 18' utilises the excess temperature from an energy roof and constitutes a heat pump with an extremely high thermal factor.

As a summary concerning the "ARR unit" 18, the invention is based on the principle that, by supplying different temperatures at the correct moment, a generated sound wave is amplified and electric energy can be withdrawn from the movement of the membrane 6 or other generated movement.

Correspondingly, sound waves can be amplified in that energy is supplied to the membrane 6 at the correct frequency.

This energy is to manifest itself as a powerful oscillation, which has temperature spikes of several hundred degrees and temperature minimum of some ten minus degrees Celsius.

By opening the valves 5, 5'; 15, 15' at an adapted correct moment, heat can be extracted (heat pump) or cold generated (refrigerator).

The construction has fundamentally the same effect as a piston in a piston-cylinder assembly and can be employed almost anywhere where pistons are put into use. The sole difference is that the physical laws for resonance in gas are employed in order to achieve a spontaneous compression/decompression. In, for example, a diesel engine, heavy pistons must move 100 mm in order to achieve diesel compression. According to the present invention, it is sufficient with a membrane movement of 1 mm in order to achieve the same compression pressure.

Hence, minimum movements are required in order to impart to a gas accumulation (17) resonance within a space 7 and achieve compression values corresponding to those which apply in diesel compression, without to this end needing to employ heavy pistons and crankshafts.

The absence of in al. piston friction against cylinder walls and other friction gives the "ARR unit" an extremely high level of efficiency.

It is merely necessary to supply energy as a relatively weak oscillation for resonance and then supply heat at exactly the correct moment at maximum compression. This amplifies the acoustic wave, in which event it is possible to extract the useful work using the same membrane 6. (Principle of loudspeaker, but with much higher output.)

The object is thus to achieve higher degrees of efficiency and more simple designs and constructions.

The same "ARR unit" may fulfil numerous different functions and as a result of the loss-free basic design and construction, it is possible to extract electric power from extremely slight temperature differences. (A conventional piston driven engine would lose all useful power in friction, which explains why a Carnot engine adapted for only 10° C. temperature difference has hitherto been considered as impossible.)

Similarly, the unit can pump heat with slight temperature increase with a heat factor (<10).

The present invention is intended to be used as an engine, heat pump, step less combination of both, air conditioning, coolant assembly, refrigerator, compressor and vacuum pump.

The present invention particularly discloses that one and the same space be able to be adapted to fulfil the function of a heat pump or of an engine unit, or both functions simultaneously, in that energy is supplied within a heat pump application and within an engine application energy is extracted, by the movement of a membrane 6, or a device serving as a membrane, within or outside the space 7.

Said space is defined by means of nodes related to a standing wave, where the defining wall portions 12, 13 of the space form two nodes for a standing wave.

Said second valve-related means, for supply or energy, are adapted at a lowest pressure to permit the supply of a quantity of energy from a heat source with an allocated low temperature during a decompression stage and in a compression stage, via said first valve-related means, to permit the supply of energy to a heat consumer.

Said first valve-related means, in a compression stage, is adapted to supply energy from a heat source at a higher temperature level in order via second valve-related means and allocated decompression stage, to give off energy at a low temperature level.

In FIG. 9 it is disclosed that a first valve-related means 5 and a second valve-related means 15 are adapted simultaneously to make for the supply or removal of energy through a simultaneous action.

A control unit, with allocated control method, is adapted to actuate said first valve-related means 5 and/or said second valve-related means 15 within the same or mutually discrete time intervals.

Figure 9A:
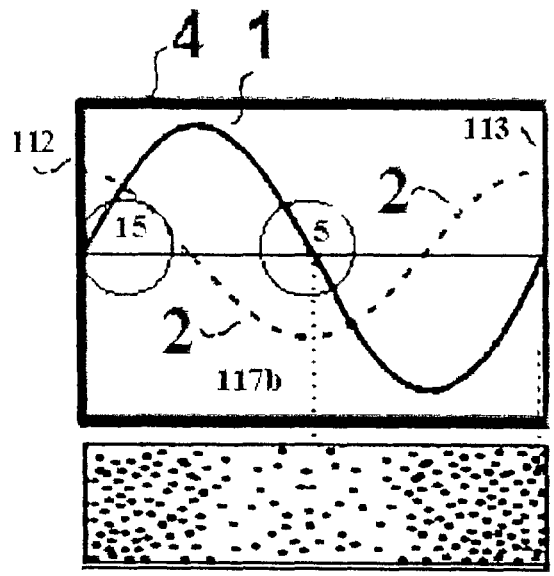
FIG. 9 is intended to illustrate in three different situations an alternative embodiment of the arrangement.

With reference to FIG. 9a, there is there illustrated an arrangement which, in relation to the embodiment illustrated in FIG. 3, displays a tube 4, 111 with fixed wall portions 112 and 113 and with a full period illustrating the graph 1 relating to "gas displacement" and a ghosted line 2 relating to pressure, with a part section in connection to the valve 5 for a decompression and a part section in connection to the valve 15 for a compression.

By having a twice as long tube 111 as in FIG. 3, there will occur for a certain frequency two bulges in the standing wave. In this embodiment, both of the valves 5, 15 can be opened simultaneously, at a high pressure and a high temperature in one valve 5 and a low pressure and a low temperature in the other valve 15. Two pistons or loudspeaker membranes are also conceivable in this embodiment. In such an event, the right-angle arrangement of the valve mechanisms illustrated in FIG. 3 is not necessary.

Figure 9B:
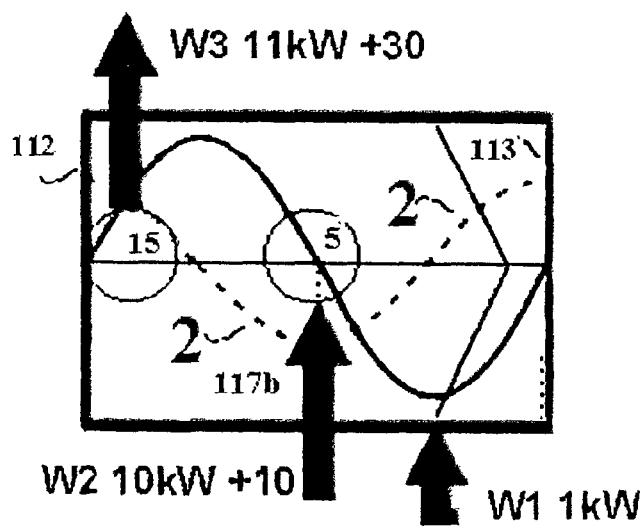
Figure 9C:
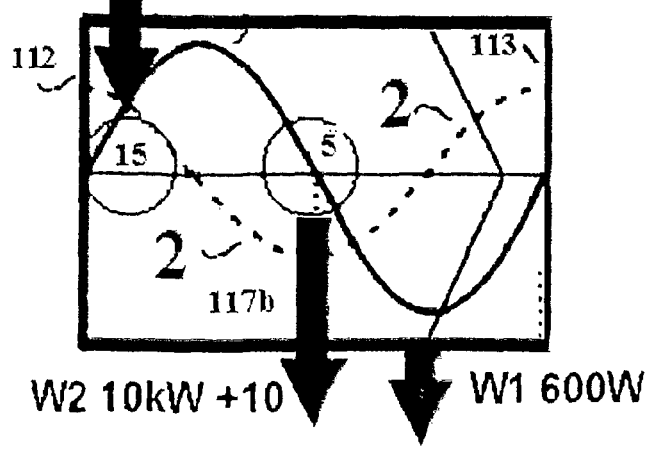

FIG. 9b illustrates the arrangement according to FIG. 9a in a heat pump application and FIG. 9c illustrates the arrangement in an engine application.

FIG. 9b is intended to illustrate the utilisation of cold, which is a landscape resource (e.g. lake) which is 10° C. The temperature can now be raised to 30° C. In such instance, electric energy is required, where W1+W2=W3. The disclosed figures in FIGS. 9b and 9c are merely intended to serve as examples.

By extracting thermal energy W3 from an energy roof (+30° C. of daylight) and heating a lake with the energy W2 which maintains 10° C., Carnot's efficiency formula (T2-T1)/T2 permits in this case 6.6% efficiency, or approx. 660 W electric power. The figures are merely intended as examples also here.

The present invention is naturally not restricted to the embodiment disclosed above by way of example, but may undergo modifications without departing from the scope of the inventive concept as illustrated in the appended Claims.

In particular, it should be taken into account that every illustrated unit and/or circuit can be combined with every other illustrated unit and/or circuit within the scope in order to attain the desired technical function.

The invention claimed is:

1. An acoustic reversible resonator adapted for energy transformation, comprising:
    a gas chamber defining a space;
    an oscillating gas volume gathered within said space, with the gas molecules given reciprocally oscillating movement within said space, which is sustained by an energy supplying device, wherein a gas compression given by the oscillating gas volume in said gas chamber makes for the creation of an elevated temperature within all or parts of said gas volume and where a gas decompression given by the oscillating gas volume in said gas chamber makes for the creation of a reduced temperature within all or parts of said gas volume;
    at least two first valves connected to said gas chamber, said first valves are arranged diametrically opposite one another in a first end region of said gas chamber and connected to a hot loop, carrying gas at high pressure and high temperature, the first valves being configured to supply or remove thermal energy to or from said oscillating gas volume within said gas chamber during a compression stage for said gas volume; and
    at least two second valves further connected to said gas chamber, and said second valves are arranged diametrically opposite one another in a second end region of said gas chamber and connected to a cold loop, carrying gas at low pressure and low temperature, the second valves being configured to supply or remove thermal energy to or from said oscillating gas volume within said gas chamber during a decompression stage for said gas volume,
    wherein said first and second valves are arranged at substantially right angles to one another, and
    wherein said first valves, in a compression stage, are adapted to supply energy from a heat source at a high temperature level, in order to emit energy at a low temperature level via said second valves, during a decompression stage, and/or wherein said second valves, for supply of energy, are adapted to supply a quantity of energy from a heat source at a given low temperature at a lowest pressure during a decompression stage and in a compression stage, to supply energy to a heat consumer via said first valves.

2. The acoustic reversible resonator as claimed in claim 1, wherein one and the same space is adapted to be able to fulfill the function of a heat pump or of an engine unit, wherein, in a heat pump application, energy is supplied and, in an engine application, energy is extracted, by the movement of a membrane of a device serving as a membrane with the gas chamber.

3. The acoustic reversible resonator as claimed in claim 1, wherein said space is defined by nodes related to a standing wave.

4. The acoustic reversible resonator as claimed in claim 2 or 3, wherein wall portions of the gas chamber form at least two nodes, for a standing wave.

5. The acoustic reversible resonator as claimed in claim 1, wherein the first and second valves are adapted to simultaneously supply or extract energy by a simultaneous action.

6. The acoustic reversible resonator as claimed in claim 1, wherein a control unit is adapted to actuate said first valves and/or said second valves within the same or mutually discrete time intervals.

7. The acoustic reversible resonator as claimed in claim 1, wherein said gas chamber has the form of a tube section with sealed end portions, the form of a torus or other corresponding configuration, where the preconditions have been created for the accumulation of acoustic energy, by the supply of small quantities of energy at each individual period.

8. The acoustic reversible resonator as claimed in claim 1, wherein a first valve mechanism, serving as said first valves, is arranged within an area where a pressure maximum is to be expected, or alternatively that a second valve mechanism, serving as said second valves, is arranged within an area where a pressure minimum is to be expected, so that a cold air flow can be fed or led through the gas chamber at and temporally proximal a pressure minimum during a decompression stage.

9. The acoustic reversible resonator as claimed in claim 1, wherein a control unit is, with its allocated control method, adapted to actuate said first and/or second valves.

10. The acoustic reversible resonator as claimed in claim 1, wherein a second valve mechanism, serving as said second valves, is arranged within an area where a pressure minimum is to be expected, or alternatively that a first valve mechanism, serving as said first valves, is arranged within an area where a pressure maximum is to be expected, so that a hot air current can be fed or led through the gas chamber at and temporally proximal a pressure maximum during a compression stage.

11. The acoustic reversible resonator as claimed in claim 1, wherein a phase difference between selected opening times for the first and second valves is, controlled by a control unit with an allocated control method, adapted to create a gas flow.

12. The acoustic reversible resonator as claimed in claim 1, wherein a membrane and/or a device is adapted to sustain an acoustic oscillation and thereby to supply acoustic energy to the oscillating gas volume and/or to extract acoustic energy from the oscillating gas volume.

13. The acoustic reversible resonator as claimed in claim 1, wherein an acoustic reversible resonator is adapted to encompass said space and associated valves and is structured as a block.

* * * * *